United States Patent
Sanders et al.

(10) Patent No.: US 12,535,014 B2
(45) Date of Patent: Jan. 27, 2026

(54) VORTEX TURBINES FOR A HYBRID-ELECTRIC AIRCRAFT

(71) Applicants: Hamilton Sundstrand Corporation, Charlotte, NC (US); Pratt & Whitney Canada Corp., Longueuil (CA)

(72) Inventors: Mitchell Sanders, Atlanta, GA (US); Todd A. Spierling, Rockford, IL (US)

(73) Assignees: Hamilton Sundstrand Corporation, Charlotte, NC (US); Pratt & Whitney Canada Corp., Longueuil (CA)

( * ) Notice: Subject to any disclaimer, the term of this patent is extended or adjusted under 35 U.S.C. 154(b) by 468 days.

(21) Appl. No.: 17/013,140

(22) Filed: Sep. 4, 2020

(65) Prior Publication Data

US 2021/0070458 A1   Mar. 11, 2021

Related U.S. Application Data

(60) Provisional application No. 62/896,988, filed on Sep. 6, 2019.

(51) Int. Cl.
*F01D 15/10* (2006.01)
*B64D 27/12* (2006.01)
(Continued)

(52) U.S. Cl.
CPC .............. *F01D 15/10* (2013.01); *B64D 27/12* (2013.01); *B64D 27/33* (2024.01); *B64D 27/357* (2024.01);
(Continued)

(58) Field of Classification Search
CPC ............. F02C 9/58; B64C 11/06; B64C 11/30
See application file for complete search history.

(56) References Cited

U.S. PATENT DOCUMENTS 5,702,071 A   12/1997   Kroll et al.
6,703,747 B2   3/2004   Kawamura
(Continued)

FOREIGN PATENT DOCUMENTS

BR   PI0622106 A2   12/2011
BR   102014025950 A2   5/2016
(Continued)

OTHER PUBLICATIONS

United Kingdom Examination Report of Nov. 12, 2021, issued during the prosecution of United Kingdom Patent Application No. GB 2014033.1, 6 pages.
(Continued)

*Primary Examiner* — Gerald L Sung
*Assistant Examiner* — Jacek Lisowski
(74) *Attorney, Agent, or Firm* — Getz Balich LLC

(57) ABSTRACT

An aircraft propulsion system includes a hybrid-electric power plant for delivering power to an air mover for propelling an aircraft. The hybrid-electric power plant includes a heat engine operatively connected to a first air mover, and an electric motor operatively connected to a second air mover. The second air mover is positioned on a wing of the aircraft outboard from the heat engine. A method for reducing trailing vortices includes powering a first air mover of an aircraft with a heat engine during a take-off stage, a climb stage, a cruise-stage and/or a descent stage. The method includes powering a second air mover of the aircraft with an electrical motor during the take-off stage and/or the climb stage. The method includes freewheeling the second air mover during the cruise stage and/or the descent stage to generate mechanical energy and reduce wing tip vortices.

18 Claims, 3 Drawing Sheets

(51) Int. Cl.
  *B64D 27/33*    (2024.01)
  *B64D 27/357*   (2024.01)
  *B64D 35/025*   (2024.01)
  *F02C 7/32*         (2006.01)
  *B64D 27/02*        (2006.01)

(52) U.S. Cl.
  CPC .............. *B64D 35/025* (2024.01); *F02C 7/32* (2013.01); *B64D 27/026* (2024.01)

(56) References Cited

U.S. PATENT DOCUMENTS

| | | | |
|---|---|---|---|
| 6,864,667 | B2 | 3/2005 | Buening et al. |
| 7,122,933 | B2 | 10/2006 | Horst et al. |
| 7,915,778 | B2 | 3/2011 | Miyata et al. |
| 8,350,437 | B2 | 1/2013 | Doushita et al. |
| 8,358,046 | B2 | 1/2013 | Platon |
| 8,368,276 | B2 | 2/2013 | Wolf et al. |
| 8,532,961 | B2 | 9/2013 | Guo |
| 8,844,143 | B2 | 9/2014 | Kirchner et al. |
| 9,174,741 | B2 | 11/2015 | Suntharalingam et al. |
| 10,145,291 | B1 | 12/2018 | Thomassin et al. |
| 10,170,954 | B2 | 1/2019 | Taniguchi et al. |
| 10,326,326 | B2 | 6/2019 | Laldin et al. |
| 10,494,117 | B2 | 12/2019 | Bosma |
| 10,518,863 | B2 * | 12/2019 | Moxon .................. B64D 27/24 |
| 2005/0199766 | A1 | 9/2005 | Knott et al. |
| 2005/0237766 | A1 | 10/2005 | Klettke |
| 2008/0017426 | A1 | 1/2008 | Walters et al. |
| 2008/0078876 | A1 | 4/2008 | Baggette et al. |
| 2008/0141921 | A1 | 6/2008 | Hinderks |
| 2010/0251692 | A1 | 10/2010 | Kinde, Sr. |
| 2010/0270417 | A1 | 10/2010 | Goldshteyn |
| 2011/0024555 | A1 | 2/2011 | Kuhn, Jr. |
| 2011/0049293 | A1 | 3/2011 | Koletzko |
| 2012/0012692 | A1 | 1/2012 | Kroo |
| 2012/0111994 | A1 | 5/2012 | Kummer et al. |
| 2012/0227389 | A1 | 9/2012 | Hinderks |
| 2013/0000314 | A1 * | 1/2013 | McCaffrey ............ F01D 13/003 60/773 |
| 2013/0020429 | A1 | 1/2013 | Kroo |
| 2013/0068876 | A1 | 3/2013 | Radu |
| 2013/0157017 | A1 | 6/2013 | Guillemaut et al. |
| 2014/0180507 | A1 | 6/2014 | Geay et al. |
| 2015/0013306 | A1 | 1/2015 | Shelley |
| 2015/0183518 | A1 | 7/2015 | Stuckl et al. |
| 2015/0210407 | A1 | 7/2015 | Griffin et al. |
| 2015/0321752 | A1 | 11/2015 | Trull et al. |
| 2016/0023747 | A1 | 1/2016 | Kempshall |
| 2016/0023773 | A1 * | 1/2016 | Himmelmann ........ B64D 27/24 903/903 |
| 2016/0144957 | A1 | 5/2016 | Claridge et al. |
| 2016/0176533 | A1 * | 6/2016 | Cazals ..................... B64C 3/32 244/54 |
| 2016/0221680 | A1 | 8/2016 | Burton et al. |
| 2016/0272310 | A1 | 9/2016 | Chan et al. |
| 2016/0304199 | A1 | 10/2016 | Chan et al. |
| 2016/0347446 | A1 | 12/2016 | Vetter et al. |
| 2016/0355272 | A1 * | 12/2016 | Moxon .................. B64D 35/04 |
| 2016/0376918 | A1 | 12/2016 | Swann et al. |
| 2017/0029131 | A1 | 2/2017 | Steinwandel et al. |
| 2017/0218975 | A1 * | 8/2017 | Bintz ........................ F02K 1/09 |
| 2017/0253342 | A1 * | 9/2017 | De Magalhães Gomes ................ B64D 27/24 |
| 2017/0320585 | A1 * | 11/2017 | Armstrong ............ B64D 27/24 |
| 2017/0341725 | A1 | 11/2017 | Skahan |
| 2018/0127103 | A1 | 5/2018 | Cantemir |
| 2018/0141655 | A1 | 5/2018 | Wall |
| 2018/0208305 | A1 | 7/2018 | Lloyd et al. |
| 2018/0215462 | A1 | 8/2018 | Fenny et al. |
| 2018/0237125 | A1 * | 8/2018 | Lisio ..................... B64C 11/303 |
| 2019/0055901 | A1 * | 2/2019 | Lamarre .................. F02C 9/44 |
| 2019/0128570 | A1 * | 5/2019 | Moxon ............. H02K 11/0094 |
| 2021/0276723 | A1 * | 9/2021 | Han ....................... B64D 27/10 |

FOREIGN PATENT DOCUMENTS

| | | |
|---|---|---|
| EP | 2212139 A2 | 8/2010 |
| EP | 3360783 A1 | 8/2018 |
| EP | 3388652 A1 | 10/2018 |
| EP | 3594125 A1 | 1/2020 |
| JP | 2014159255 A | 9/2014 |
| JP | 2015006650 A | 1/2015 |
| JP | WO2017126584 A1 | 12/2018 |
| KR | 200408970 Y1 | 2/2006 |
| KR | 20070039699 A | 4/2007 |
| KR | 101277645 B1 | 6/2013 |
| KR | 20150078018 A | 2/2015 |
| KR | 101513661 B1 | 4/2015 |
| KR | 101659783 B1 | 9/2016 |
| KR | 101752859 B1 | 6/2017 |
| WO | 2009053649 A1 | 4/2009 |
| WO | 2010020199 A1 | 2/2010 |
| WO | 2011005066 A2 | 1/2011 |
| WO | 2018058137 A1 | 3/2018 |
| WO | 2018099856 A1 | 6/2018 |
| WO | 2018104929 A1 | 6/2018 |

OTHER PUBLICATIONS

United Kingdom Search and Examination Report dated Jan. 29, 2021, issued during the prosecution of United Kingdom Patent Application No. GB 2014033.1.

* cited by examiner

VORTEX TURBINES FOR A HYBRID-ELECTRIC AIRCRAFT

CROSS-REFERENCE TO RELATED APPLICATIONS

This application claims priority to and the benefit of U.S. Provisional Application No. 62/896,988, filed Sep. 6, 2019, the entire contents of which are herein incorporated by reference in their entirety.

BACKGROUND

1. Field

The subject invention is directed to wing tip device configurations in aircraft, and more particularly, to wing tip mounted vortex turbines for hybrid-electric propulsion systems.

2. Description of Related Art

The level of air traffic continues to increase worldwide, leading to increased fuel consumption and air pollution. Consequently, efforts are underway to make aircraft more environmentally compatible through the use of specific types of fuel and/or by reducing fuel consumption through the use of more efficient drive systems.

On a wing of an aircraft, lift differentials along the wing span induce vortices. These vortices are particularly noticeable as trailing vortices at the wing tips. Wing tip vortices can contribute to aircraft induced drag and can also amplify aircraft wake. Traditional static wing tip devices, such as winglets, are sometimes used to attenuate wing tip vortex effects. While these winglets are effective, they do not capture mechanical energy from these vortices and are unable to provide propulsive force.

The conventional wing tip devices have been considered satisfactory for their intended purpose. However, there is an ever-present need for improved wing tip devices which reduce wing tip vortices and increase aircraft efficiency in flight. This disclosure provides a proposal for such a device.

SUMMARY

An aircraft propulsion system includes a hybrid-electric power plant for delivering power to at least one air mover for propelling an aircraft. The hybrid-electric power plant includes a heat engine operatively connected to a first air mover, and an electric motor operatively connected to a second air mover. The second air mover is positioned on a wing of the aircraft outboard from the heat engine.

The electric motor can be positioned on the wing of the aircraft outboard from the heat engine. The second air mover can be positioned on a wing tip of the wing of the aircraft. The second air mover can be positioned more proximate a wing tip of the wing than to the heat engine. The electric motor can be positioned on a wing tip of the wing of the aircraft. The electric motor can be positioned more proximate a wing tip of the wing than to the heat engine. The hybrid-electric power plant can include a third air mover and a fourth air mover. The heat engine and the electric motor can be a first heat engine and a first electric motor. The aircraft propulsion system can include a second heat engine and a second electric motor. The third air mover can be operatively connected to the second heat engine. The fourth air mover can be operatively connected to the second electric motor.

The wing can be a first wing. The first heat engine and the first electric motor can be positioned on the first wing. The second heat engine, the second electric motor and the fourth air mover can be positioned on a second wing. The fourth air mover can be positioned outboard from the second heat engine. The second electric motor can be positioned outboard from the second heat engine. The fourth air mover can be positioned on a wing tip of the second wing of the aircraft. The fourth air mover can be positioned more proximate a wing tip of the second wing than to the second heat engine. The electric motor can be electrically connected to at least one battery storage to provide power thereto and receive power therefrom. The electric motor can be a motor-generator. The second air mover can be a variable pitch air mover. The second air mover can be positioned on an aft side of the electric motor to capture trailing vortices.

In accordance with another aspect, a method for reducing trailing vortices includes powering a first air mover of an aircraft with a heat engine during a take-off stage, a climb stage, a cruise-stage and/or a descent stage. The method includes powering a second air mover of the aircraft with an electrical motor during the take-off stage and/or the climb stage. The method includes freewheeling the second air mover during the cruise stage and/or the descent stage to generate mechanical energy and reduce wing tip vortices.

The method can include converting the mechanical energy from the second air mover to electrical energy with the electrical motor. The method can include storing the electrical energy in at least one battery storage. The method can include adjusting blade camber, blade angle-of-attack, and/or blade twist of the blade of the second air mover. The second air mover can be positioned on a wing tip of a wing of the aircraft.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
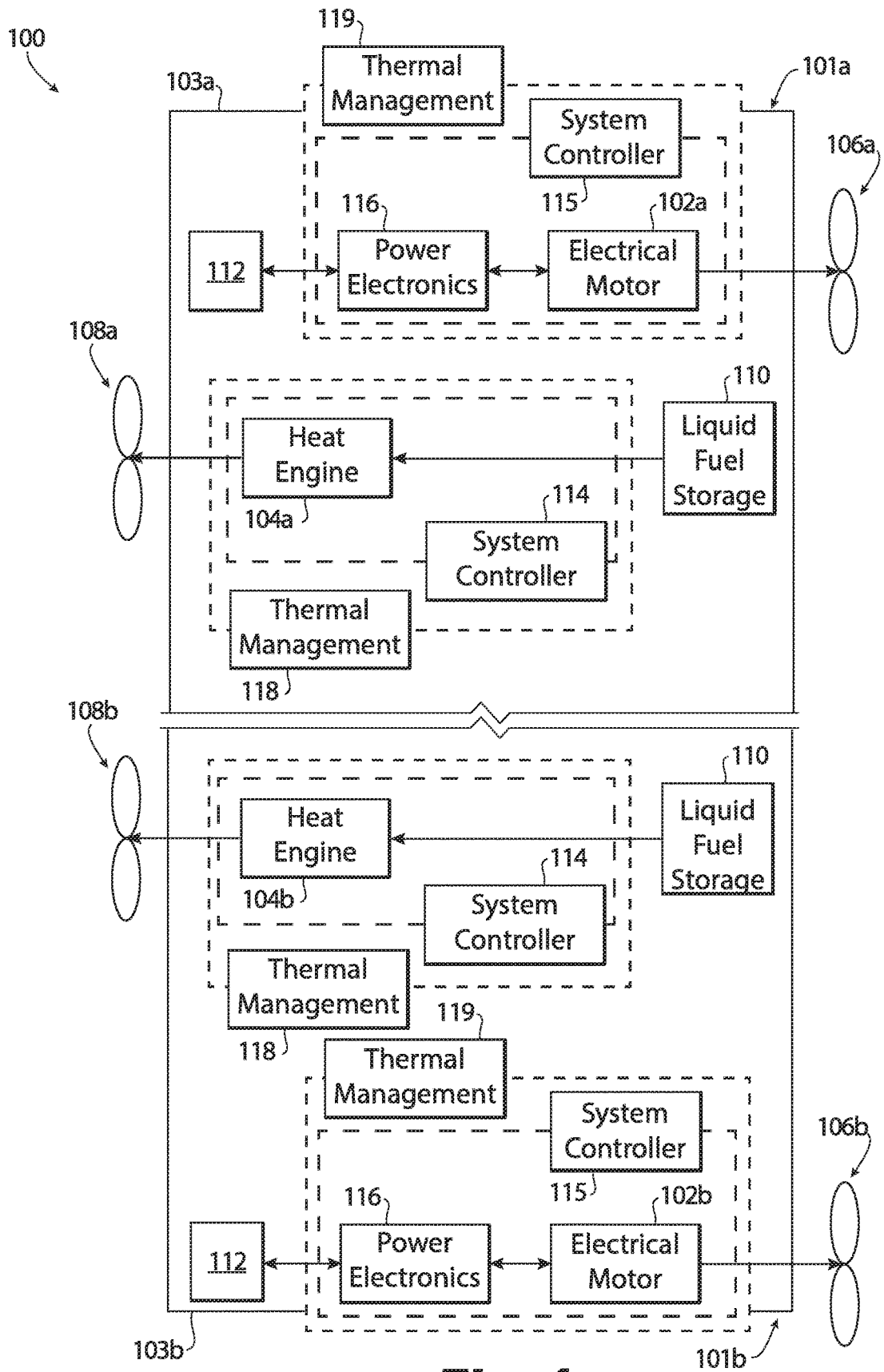
FIG. 1 is a schematic depiction of an embodiment of a hybrid-electric propulsion system constructed in accordance with the present disclosure, showing the electric motors and the heat engines.

Reference will now be made to the drawings wherein like reference numerals identify similar structural features or aspects of the subject disclosure. For purposes of explanation and illustration, and not limitation, an embodiment of a system in accordance with the disclosure is shown in FIG. 1 and is designated generally by reference character 100. Other embodiments of systems in accordance with the disclosure, or aspects thereof, are provided in FIGS. 2-5. System 100, as will be described, facilitates hybrid-electric propulsion for an aircraft with electric motors and air movers positioned at the wing tips to act as vortex turbines. These vortex turbines attenuate wing tip vortex effects while mechanically capturing energy from the wing tip vortices. This results in reduced drag and reduced aircraft wake. This also allows for capture of mechanical energy for increased battery state of charge during flight.

Figure 2:
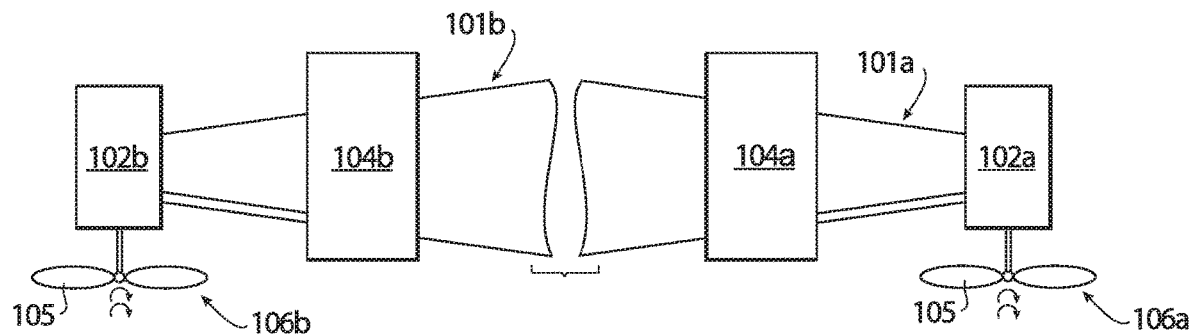
FIG. 2 is a schematic depiction of the hybrid-electric propulsion system of FIG. 1, showing the electric motors and the air movers positioned on respective wing tips.
Figure 3:
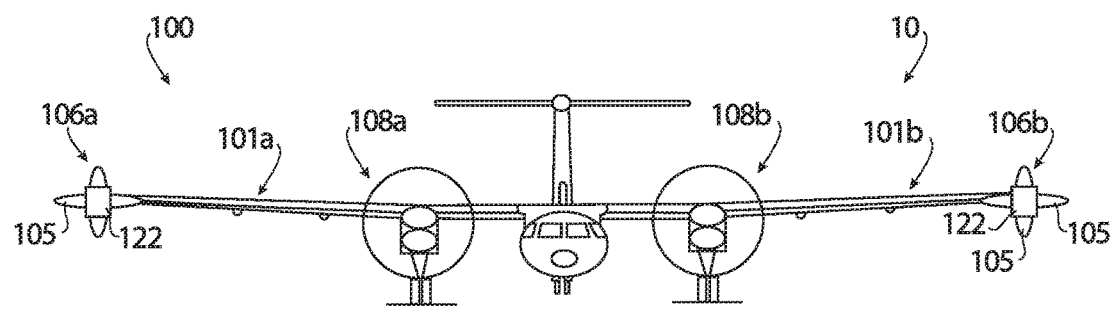
FIG. 3 is a schematic depiction of a front view of an aircraft constructed in accordance with the present disclosure, showing the hybrid-electric propulsion system of FIG. 1.

As shown in FIGS. 1-3, an aircraft propulsion system 100 includes a hybrid-electric power plant for delivering power to a plurality of air movers 106a, 108a for propelling an aircraft 10. The hybrid-electric power plant includes a heat engine 104a operatively connected to a first air mover 108a, and an electric motor 102a operatively connected to a second air mover 106a. System 100 of FIG. 1 includes two hybrid-electric power plants (one on each wing 101a and 101b). The second hybrid-electric power plant includes a second heat engine 104b operatively connected to a third air mover 108b, and a second electric motor 102b operatively connected to a fourth air mover 106b. First heat engine 104a and first electric motor 102a are positioned on the first wing 101a. Second heat engine 104a, second electric motor 102b and fourth air mover 106b are positioned on a second wing 101b. Air movers 106a, 106b, 108a and 108b can be a variety of suitable air moves, such as a fan, a propeller or the like. While the aircraft propulsion system 100 includes two hybrid-electric power plants (e.g. one on each wing) those skilled in the art will readily appreciate that one or more than two hybrid-electric power plants can be used.

As shown in FIG. 1, each electric motor 102a and 102b is operatively connected to a respective system controller 115, respective power electronics 116 and a respective thermal management system 119. Each system controller 115 operates to execute the method described below, for example. Respective power electronics 116 include various rectifiers, inverters, and the like to convert AC to DC power for storage and/or DC to AC power for use by motors 102a or 102b. Thermal management system 119 includes a variety of cooling components, e.g. cooling circuits, pumps, and the like. Those skilled in the art will readily appreciate that, while each electric motor 102a and 102b is shown as having its own respective system controller 115, power electronics 116 and thermal management system 119, electric motors 102a and 102b can share one or more of these components.

With continued reference to FIG. 1, each heat engine 104a and 104b is operatively connected to a respective system controller 114, a respective thermal management system 118 and a respective fuel storage 110. Each system controller 114 operates to execute the method described below, for example. Thermal management system 118 includes a variety of cooling components, e.g. cooling circuits, pumps, and the like. Fuel storages 110 provide liquid fuel to one or more of heat engines 104a and 104b. Those skilled in the art will readily appreciate that, while each heat engine 104a and 104b is shown as having its own respective system controller 114, fuel storage 110 and thermal management system 118, heat engines 104a and 104b can share one or more of these components, e.g. they can both be in fluid communication with the same fuel storage 110.

Figure 4:
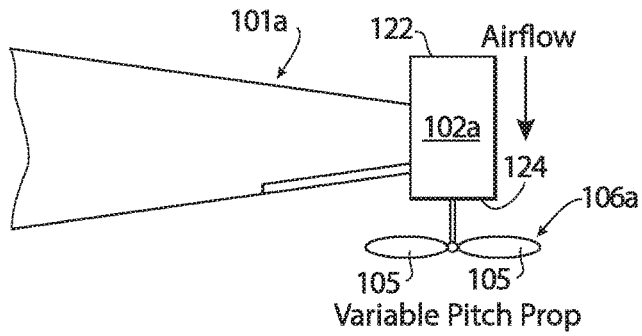
FIG. 4 is a schematic depiction of a top view of a portion of an aircraft constructed in accordance with the present disclosure, showing the air mover positioned on an aft side of the electric motor.

With reference now to FIGS. 2-4, first and second electric motors 102a and 102b along with their respective air movers 106a and 106b act as vortex turbine motors, e.g. motor-generators. Each motor 102a and 102b has a respective forward side 122 and an aft side 124. Those skilled in the art will readily appreciate that each motor 102a and 102b can be housed in a respective aerodynamic nacelle positioned on a respective wing tip. Air movers 106a and 106b are each positioned on an aft side 124 of their respective electric motors 102a and 102b to capture the mechanical energy of trailing vortices. During take-off and climb, air movers 106a and 106b act as propulsive members and are driven by their respective electric motors 102a and 102b. During cruise and descent, air movers 106a and 106b act as passive members and can spin in freewheel to allow the electric motors 102a and 102b to capture mechanical energy generated from air mover spin. In turn, this mechanical energy is converted into electrical energy by the electric motors 102a and 102b and stored in one or more batteries of battery storages 112 to increase the battery state of charge during flight. By increasing the battery stage of charge during flight, fewer batteries would be required to maintain the same net battery discharge in flight, thereby reducing aircraft weight. Additionally, on-ground aircraft turn-over time may also be reduced, as reduced on-ground battery recharge will be required. Moreover, by capturing these wing tip vortices, the vortices are made smaller and induced drag is reduced, allowing for increased fuel efficiency and endurance.

With continued reference to FIGS. 2-4, air movers 106a and 106b are each variable pitch air movers such that the angle of attack of the propeller blades 105 may be modulated (either in real-time or before or after flight). This will allow the tradeoff between drag reduction and power generation to be adjusted. In some embodiments, the angle of attack of the propeller blades 105 can be adjusted based on mission duration (either in real-time or before or after flight). For example, for longer flights, drag reduction may be prioritized over power generation, while for shorter flights, power generation will be prioritized over drag reduction. In some embodiments, the camber and twist of the blades 105 may be selected to further adjust the tradeoff between power generation and induced drag reduction.

With continued reference to FIGS. 1-3, second air mover 106a and fourth air mover 106b are positioned on respective wings 101a or 101b of the aircraft 10 outboard from respective heat engines 104a or 104b. Each electric motor 102a and 102b is positioned on a respective one of wings 101a or 101b of the aircraft 10 outboard from their respective heat engines 104a and 104b. Each electric motor 102a and 102b is positioned on a respective wing tip 103a and 103b. Second air mover 106a and fourth air mover 106b are positioned on respective wing tips 103a and 103b of a given one of wings 101a or 101b of the aircraft 10. Second air mover 106a is positioned more proximate to its respective wing tip 103a of wing 101a than to heat engine 104a on that wing 101a. Fourth air mover 106b is positioned more proximate to its respective wing tip 103b of wing 101b than to heat engine 104b on that wing 101b. Electric motor 102a is positioned more proximate to its respective wing tip 103a of wing 101a than to heat engine 104a on that wing 101a. Second electric motor 102b is positioned more proximate to its respective wing tip 103b of wing 101b than to heat engine 104b on that wing 101b.

As shown in FIG. 1, each electric motor 102a and 102b is electrically connected to a battery storage 112 to provide power thereto and receive power therefrom. Battery storages 112 shown in FIG. 1 can be the same battery storage 112 or different battery storages 112. Each battery storage 112 can include a plurality of battery cells. While battery storages 112 are shown positioned in the wings 101a and 101b, those skilled in the art will readily appreciate that battery storages 112 can be in a variety of suitable places throughout the aircraft, such as the fuselage.

A method for reducing trailing vortices includes powering a first air mover, e.g. air mover 108a or 108b, of an aircraft, e.g. aircraft 10, with a heat engine, e.g. heat engine 104a or 104b, during at least one of a take-off stage, a climb stage, a cruise-stage and/or a descent stage. The method includes powering a second air mover, e.g. air mover 106a or 106b, of the aircraft with an electrical motor, e.g. electric motor 102a or 102b, during at least one of the take-off stage and/or the climb stage. The positioning of the second air mover, e.g. air mover 106a or 106b, allows for perpetual reduction in drag effects of trailing vortices in flight. The powering of the air movers via the heat engine and/or the electric motor is reflected in charts 200 and 202 of FIG. 5. As the aircraft takes off, the overall aircraft power is supplemented with electrical power through the electric motor. The method includes freewheeling the second air mover during at least one of the cruise stage and/or the descent stage to generate mechanical energy while simultaneously reducing wing tip vortices.

Figure 5:
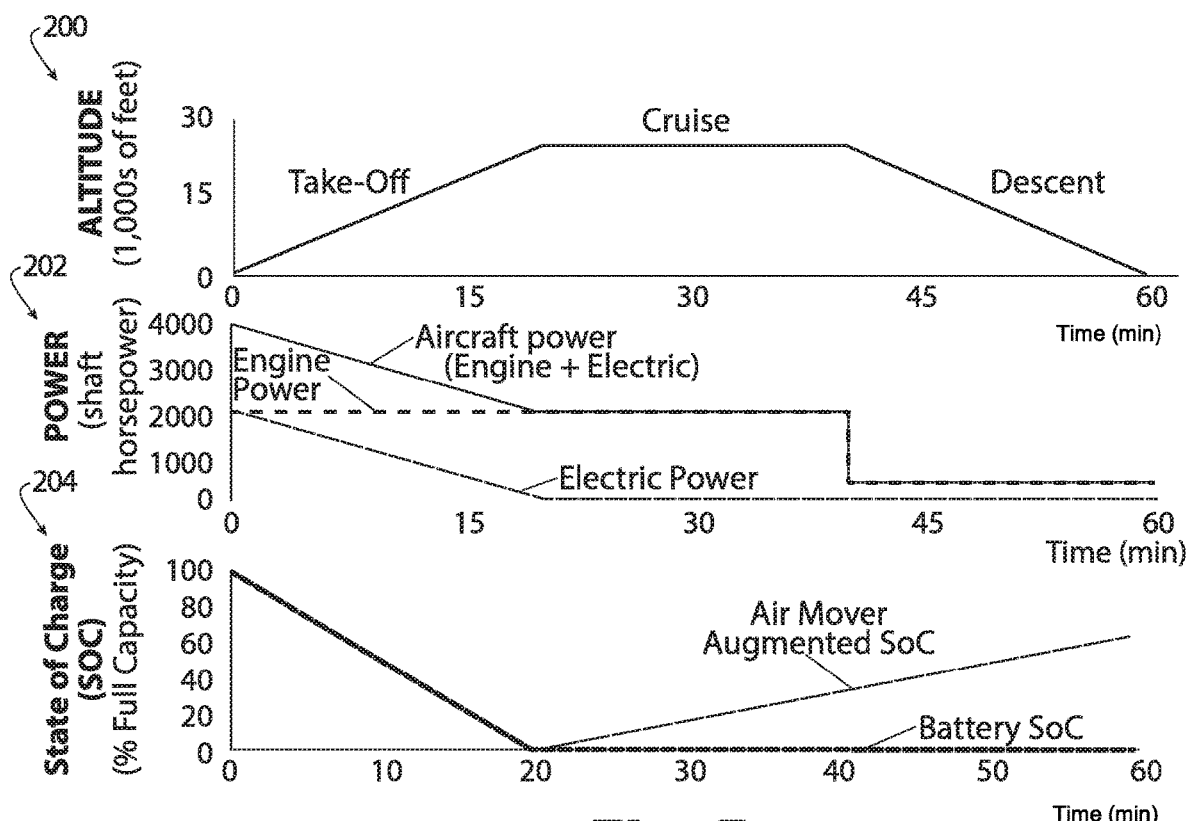
FIG. 5 is a graphical depiction of altitude, power and battery state of charge for an aircraft constructed in accordance with the present disclosure having the hybrid-electric propulsion system of FIG. 1.

As shown in FIG. 5, the method includes converting the mechanical energy from the second air mover (during cruise and/or descent) to electrical energy with the electrical motor. The charts 200, 202 and 204 of FIG. 5 all reflect a sample flight time of 60 minutes and show different characteristics over that given sample flight time. The conversion of the mechanical energy from the second air mover to electrical energy is reflected by the battery State of Charge (SoC) chart 204 and the altitude chart 202. Charts 202 and 204 show the SoC of a battery increasing over time as the aircraft is in cruise and descent. The method includes storing the electrical energy in at least one battery storage, e.g. battery storage 112. The method includes adjusting at least one of blade camber, blade angle-of-attack, and/or blade twist of at least one blade, e.g. blade 105, of the second air mover.

The methods and systems of the present disclosure, as described above and shown in the drawings, provide for reduced weight and drag, which results in reduced fuel consumption. While the systems and methods of the subject disclosure have been shown and described with reference to preferred embodiments, those skilled in the art will readily appreciate that changes and/or modifications may be made thereto without departing from the scope of the subject disclosure.

What is claimed is:

1. An aircraft propulsion system, comprising:
a first air mover;
a second air mover; and
a hybrid-electric power plant for delivering power to the first air mover and the second air mover for propelling an aircraft, wherein the hybrid-electric power plant includes:
a heat engine operatively connected to the first air mover, the heat engine configured to drive rotation of the first air mover during aircraft climb and during aircraft cruise, the heat engine including a first system controller;
a battery storage; and
an electric motor electrically coupled to the battery storage and operatively connected to the second air mover, the second air mover positioned on a first wing of the aircraft outboard from the heat engine, the electric motor comprising a motor-generator, the motor-generator configured to generate electric power during the aircraft cruise and provide the electric power to the battery storage, and the motor-generator configured to mechanically drive rotation of the second air mover during the aircraft climb, the electric motor including a second system controller;
wherein the first air mover, the second air mover, and the hybrid-electric power plant are attached to the first wing of the aircraft;
wherein the first system controller is separate to the second system controller;
wherein the electric motor converts mechanical energy from the second air mover into electrical energy during the aircraft cruise and the aircraft descent;
wherein the second air mover is a variable pitch air mover;
wherein the second system controller is configured to control the variable pitch air mover to modulate, in real-time, an angle of attack of propeller blades of the second air mover based on a flight duration and a corresponding prioritization of power generation versus wing tip vortex reduction; and
wherein a state of charge of the battery storage decreases during the aircraft climb and increases from the electrical energy during the aircraft cruise and the aircraft descent.

2. The system as recited in claim 1, wherein the electric motor is positioned on the first wing of the aircraft outboard from the heat engine.

3. The system as recited in claim 1, wherein the second air mover is positioned on a wing tip of the first wing of the aircraft.

4. The system as recited in claim 1, wherein the second air mover is positioned closer to a wing tip of the first wing than to the heat engine.

5. The system as recited in claim 1, wherein the electric motor is positioned on a wing tip of the first wing of the aircraft.

6. The system as recited in claim 1, wherein the electric motor is positioned closer to a wing tip of the first wing than to the heat engine.

7. The system as recited in claim 1, further comprising a third air mover and a fourth air mover, wherein the heat engine and the electric motor are a first heat engine and a first electric motor, wherein the aircraft propulsion system includes a second heat engine and a second electric motor, wherein the third air mover is operatively connected to the second heat engine, and wherein the fourth air mover is operatively connected to the second electric motor.

8. The system as recited in claim 7, wherein the first heat engine and the first electric motor are positioned on the first wing, wherein the second heat engine and the second electric motor are positioned on a second wing, and wherein the fourth air mover is positioned outboard from the second heat engine.

9. The system as recited in claim 8, wherein the second electric motor is positioned outboard from the second heat engine.

10. The system as recited in claim 8, wherein the fourth air mover is positioned on a wing tip of the second wing of the aircraft.

11. The system as recited in claim 8, wherein the fourth air mover is positioned closer to a wing tip of the second wing than to the second heat engine.

12. The system as recited in claim 1, wherein the electric motor is configured to receive electric power from the battery storage during the aircraft climb.

13. The system as recited in claim 1, wherein the second air mover is positioned on an aft side of the electric motor to capture trailing vortices.

14. The system as recited in claim 1, wherein the second air mover is in a passive state during the aircraft cruise and the aircraft descent.

15. A method for reducing trailing vortices, comprising:
mechanically driving a first air mover of an aircraft with a heat engine during a takeoff stage, a climb stage, a cruise stage and a descent stage;
mechanically driving a second air mover of the aircraft with a motor-generator during at least one of the take off stage or the climb stage;
freewheeling a forward side of a propeller blade of the second air mover during the cruise stage to generate mechanical energy and reduce wing tip vortices; and
converting the mechanical energy from the second air mover to electrical energy with the motor-generator during the cruise stage where the second air mover mechanically drives operation of the motor-generator,
wherein the first air mover is facing a first side of a wing, and the second air mover is mounted on a second side of the wing with the forward side of the propeller blade facing a direction that is opposite to the first side of the wing; and
wherein the second air mover is a variable pitch air mover, and the variable pitch air mover is controlled configured to modulate, in real-time, an angle of attack of the propeller blade of the second air mover based on a flight duration and a corresponding prioritization of power generation versus wing tip vortex reduction.

16. The method as recited in claim 15, further comprising storing the electrical energy in at least one battery storage.

17. The method as recited in claim 15, further comprising adjusting at least one of blade camber or blade twist of the propeller blade.

18. An aircraft propulsion system, comprising:
a first air mover;
a second air mover having a propeller blade having a forward side, the propeller blade configured to generate mechanical energy during freewheel; and
a hybrid-electric power plant for delivering power to the first air mover and the second air mover for propelling an aircraft, wherein the hybrid-electric power plant includes:
 a heat engine operatively connected to the first air mover, the heat engine configured to drive rotation of the first air mover during aircraft climb and during aircraft cruise;
 a battery storage; and
 an electric motor electrically coupled to the battery storage and operatively connected to the second air mover, the second air mover mounted on a wing of the aircraft outboard from the heat engine, the electric motor comprising a motor-generator, the motor-generator configured to generate electric power during the aircraft cruise and provide the electric power to the battery storage, and the motor-generator configured to mechanically drive rotation of the second air mover during the aircraft climb, the electric motor including a system controller;
wherein the first air mover is mounted on a forward side of the wing of the aircraft;
wherein the second air mover is mounted on an aft side of the wing such that the forward side of the propeller faces the aft side of the wing;
wherein the second air mover is mounted aft of the electric motor;
wherein the electric motor converts mechanical energy from the second air mover into electrical energy during the aircraft cruise and the aircraft descent;
wherein the second air mover is a variable pitch air mover;
wherein the system controller is configured to control the variable pitch air mover to modulate, in real-time, an angle of attack of the propeller blade of the second air mover based on a flight duration and a corresponding prioritization of power generation versus wing tip vortex reduction; and
wherein a state of charge of the battery storage decreases during the aircraft climb and increases from the electrical energy during the aircraft cruise and the aircraft descent.

* * * * *